United States Patent
Durand

[19]

[11] Patent Number: 6,129,647
[45] Date of Patent: Oct. 10, 2000

[54] GEAR REDUCER COMPRISING ECCENTRICS

[76] Inventor: François Durand, 77 rue du Bateau, Antibes F-06600, France

[21] Appl. No.: 08/737,247

[22] PCT Filed: Jun. 12, 1995

[86] PCT No.: PCT/FR95/00763

§ 371 Date: Jan. 12, 1999

§ 102(e) Date: Jan. 12, 1999

[87] PCT Pub. No.: WO95/34771

PCT Pub. Date: Dec. 21, 1995

[30] Foreign Application Priority Data

Jun. 13, 1994 [FR] France .................................. 94 07404

[51] Int. Cl.[7] .............................................................. F16H 1/32
[52] U.S. Cl. .......................................................... 475/176
[58] Field of Search ............................................. 475/176

[56] References Cited

U.S. PATENT DOCUMENTS 5,232,412  8/1993  Zheng et al. ............................. 475/176

Primary Examiner—Dirk Wright

[57] ABSTRACT

Planacentric gear box having at least one gear wheel with external teeth (8) meshing with a gear ring with internal teeth (5) whose number of teeth is slightly bigger than the number of teeth of the gear wheel (8), this gear wheel (8) orbiting inside the gear ring (5) by the means of two eccentrics (27)(28) synchronously and simultaneously driven by prime reducers having a common input shaft, planacentric gear box for which the eccentic bearings (23)(24) are located outside the gear ring (5), the gear wheel with external teeth (8) being fixed on a torque arm (14) passing beside the gear ring (5), this torque arm (14) having, diametricaly opposed, two protuberances (19)(20) receiving each the outer ring of the bearings for the eccentrics (27)(28) which are generating the orbitation of the gear wheel (8), the median planes of the gear wheel (8) and of the eccentric bearings (23)(24) being close one to the other.

6 Claims, 5 Drawing Sheets

GEAR REDUCER COMPRISING ECCENTRICS

A planacentric gear box has a gear ring with internal teeth meshing with a gear wheel with external teeth, the number of teeth of the gear wheel beeing slightly smaller than the number of teeth of the gear ring, the center-distance between the gear wheel and the gear ring is very small, it is half the difference of number of teeth multiplied by the module. By the means of eccentrics, the gear wheel orbits inside the gear ring, this allows to obtain a big ratio with one gear train, its value is number of teeth of gear ring divided by the difference of number of teeth between gear ring and gear wheel. The orbiting of gear wheel inside the gear ring can be made by a synchronised rotation of two eccentrics whose axles are parallel to the axles of gear wheel and gear ring, those eccentrics rotates in the elements that orbits. The eccentric bearings carry the efforts corresponding to the low speed output torque but they rotate with the speed corresponding to the output speed multiplied by the ratio of the planacentric gear train; consequently those bearings carry big loads with a relatively fast rotation. A way to reduce reactions on those bearings is to increase the center distance between the two eccentrics having them located outside the gear ring, this configuration can be seen on FIG. 1 of Euro patent application 0 465 292 A1 of Mr. Periou but in this case it is the gear ring that orbits around the gear wheel and this does not allow to transmit efforts, their is an incompatibility between the directions of the rotation of the gear wheel and of the efforts on the meshing teeth. When the difference of number of teeth between gear ring and gear wheel is small, 2 or 4, the meshing conditions are such that on one hand it is surfaces and not lines that carry the loads and on the other hand the gliding between the carrying teeth is practically none, the teeth work like splines, consequently the loads that such a planacentric gear train can carry are enormous, their limit is not fixed by the teeth but by the eccentric bearings and by the ovalisation of the gear ring.

The present invention is a planacentric gear box which uses the advantages of this type of gear box:

A big ratio with one gear train.

Surface contact for the teeth.

No gliding between the meshing teeth.

This minimising the disadvantages:

B 10 life time for the eccentric bearings.

Ovalisation of the gear ring.

Unbalanced forces due to orbitation of the gear wheel.

This planacentric gear box has a low speed hub with a circular rib whose periphery is connected to a gear ring with internal teeth which meshes with a gear wheel with external teeth, this gear wheel orbiting inside the gear ring by the means of two eccentric shafts which are synchronously driven by prime reducers having, in a well known manner, cylindrical gears, bevel gears, worm gears or toothed belts, those prime reducers beeing driven by a common input shaft; planacentric gear box for which the eccentic bearings are located outside the gear ring, this gear ring is rigidly connected to the low speed hub and the gear wheel is fixed on a torque arm which passes beside the gear ring, this torque arm has, diametricaly opposed, two protuberances which receive each the outer ring of the bearings for the eccentrics which are generating the orbitation of the torque arm and consequently of the gear wheel, the median planes of the gear wheel and of the eccentric bearings are close one to the other, the eccentric shafts are journaled in the side walls of the gear box housing. This configuration is good for very low output speeds which means that the centrifugal forces due to orbitation can be neglected. For rotation speeds of the eccentric shafts bigger than 150 R.p.m. the orbiting masses can generate centrifugal forces which may not be neglected, those forces have to be compensated and for the planacentric gear box according to the invention, the low speed hub has a circular rib located in its median plane whose periphery is rigidly connected to the median part of a gear ring with internal teeth which is divided in two equal parts by the circular rib of the hub. Each part of the gear ring meshes with a gear wheel with external teeth which are each respectively connected to a torque arm passing on each side of the gear ring. Those torque arms have each, diametricaly opposed, two protuberances which receive each the outer ring of the eccentric bearings which generate the orbitation of each torque arm and consequently of each gear ring. The median plane of each gear wheel and of its eccentric bearings are respectively close one to each other. The eccentric bearings are located on eccentric shafts which are journaled in the side walls of the gear box housing. The two eccentrics for one torque arm and the two eccentrics for the other torque arm are shifted two toward the two others, this to balance the centrifugal forces due to the orbiting masses. If their is only two eccentric shafts for the two torque arms, each eccentric shaft has two eccentrics shifted 180° one toward the other. One eccentric of each eccentric shaft is used for one torque arm, the other eccentric of each eccentric shaft is used for the other torque arm. For the planacentric gear box according to the invention, the torque arms may have a cylindrical centering element coming inside the gear ring with internal teeth, the gear wheels with external teeth being centered on the cylindrical centering elements, the gear wheels are then respectively rotationaly connected to each cylindrical centering element by the means of elastic split pins which have each a protuberance for avoiding the rotation of the split pins around their own axles. The slight rotation under load between gear wheel and cylindrical centering element of the torque arm, due to elastic deformation of the split pins, allows to avoid, due to machining tolerances, that all the power passes by only one gear wheel, with this elastic split pins, the load sharing between the two gear wheels can be between 50%—50% and 60%–40% but never 100%–0%. When for the same torque arm, the bearings of the two eccentrics have the same internal clearance, the sharing of the efforts, acting in the common plane for the two eccentric shafts, between the two eccentric bearings is not well defined. On top of this, in case of temperature variations between torque arm and gear box housing, big parasitic efforts can be generated as well in the eccentric bearings as in the bearings journaling the eccentric shafts in the gear box housing. To solve this problem for the gear box according to the invention, each torque arm may have on one side a bearing located directly in a protuberance and on the other side a bearing located in a gliding bloc that can glide between protuberances of the torque arm, this allows, with minimal parasitic efforts, on one side to adapt the center distance between the two eccentric bearings to the center distance between the eccentric shafts bearings in the gear box housing, on the other side it allows to have a well defined sharing of the efforts between the two eccentric bearings of the same torque arm, the efforts acting in the common plane for the two eccentrics are carried only by the bearing directly located in the protuberance of the torque arm, the eccentric bearing located in a gliding bloc carry only efforts acting perpendicular to the common plane for the two eccentric shafts. For relatively small gear boxes machined with high precision and for which the temperature variations between torque arm and housing can be very small, it is possible to avoid the gliding bloc by having one eccentric bearing with normal internal clearance and the other eccentric bearing with increased internal clearance, for instance C3, both located directly in the protuberances of the torque arm. When each eccentric shaft has two eccentrics shifted 180°, one eccentric receive a bearing located directly in the protuberance of one torque arm and the other eccentric receive a bearing located in a gliding bloc for the other torque arm, each torque arm has one eccentric bearing located directly in a protuberance and one eccentric bearing located in a gliding bloc.

The joined drawings show, in a non limiting manner, planacentric gear boxes according to the invention.

Figure 1:
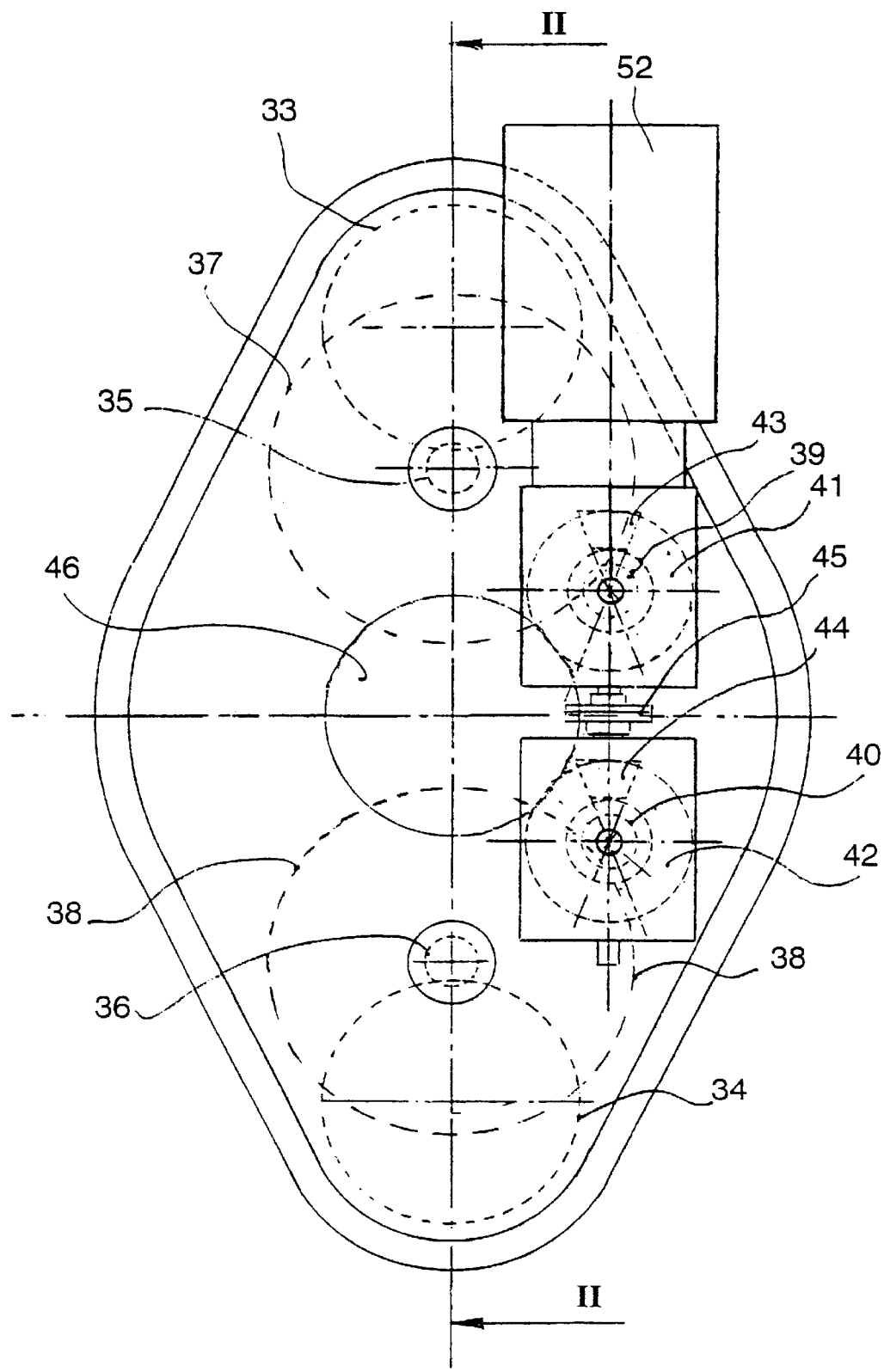
FIG. 1 is a front vue showing in dotted lines the outside diameters of the gears for the prime reducers.
Figure 2:
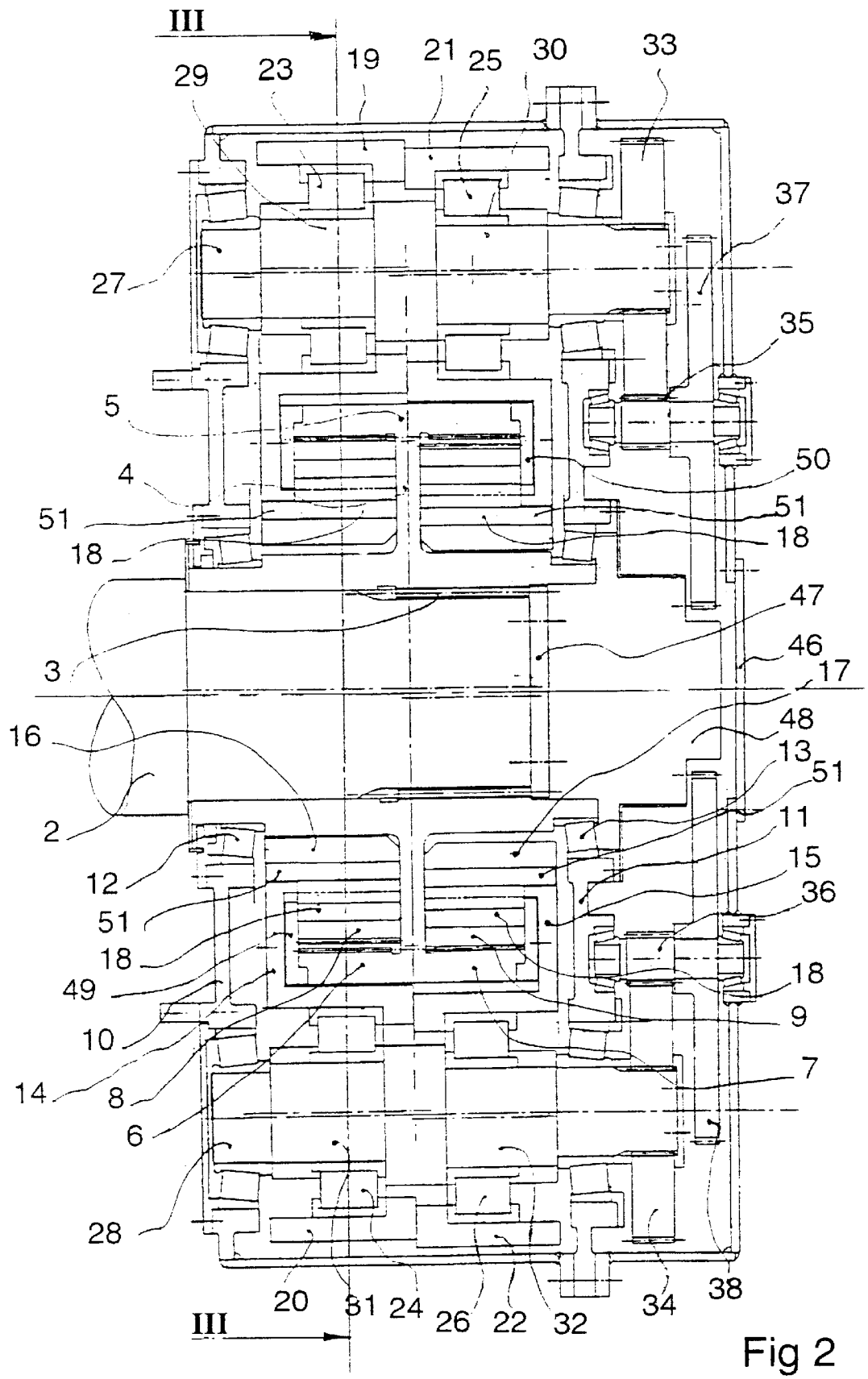
FIG. 2 is a vue passing through plane II,II of FIG. 1, it shows the eccentics as well as the cylindrical prime reducers.
Figure 3:
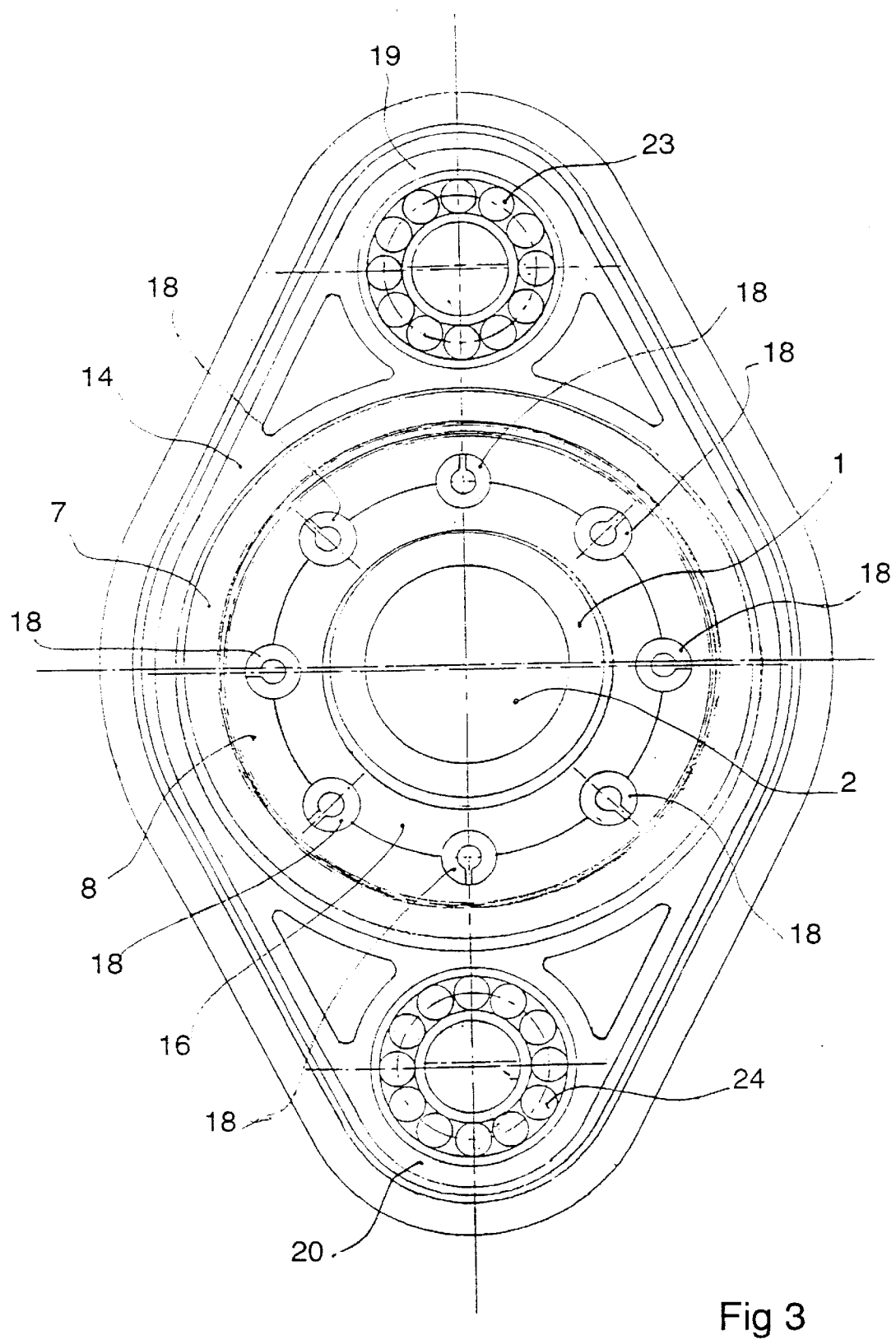
FIG. 3 is a vue passing by the median plane of the eccentric bearings of one torque arm, plane III,III on FIG. 2
Figure 4:
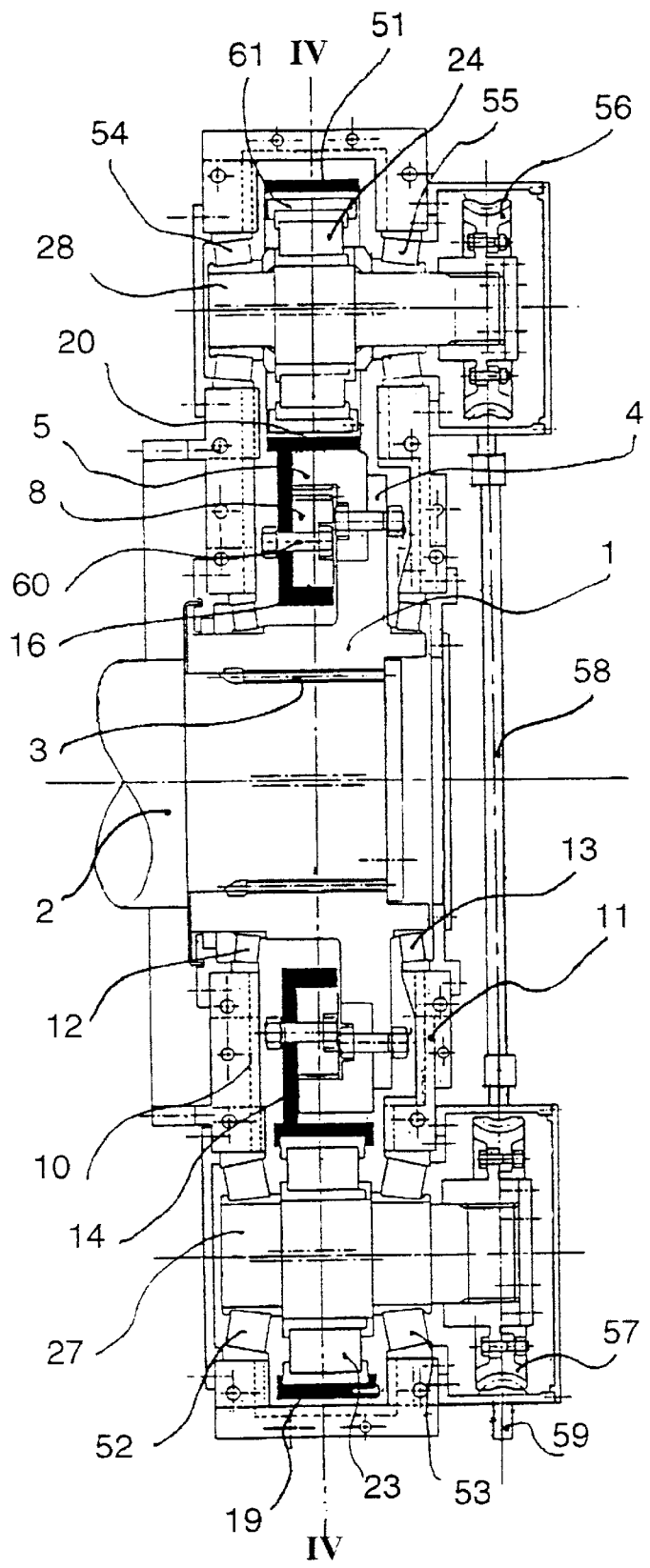
FIG. 4 is a vue similar to FIG. 2 but for a gear box with very low output speed, only one eccentric per eccentric shaft and worm gear prime reducers.
Figure 5:
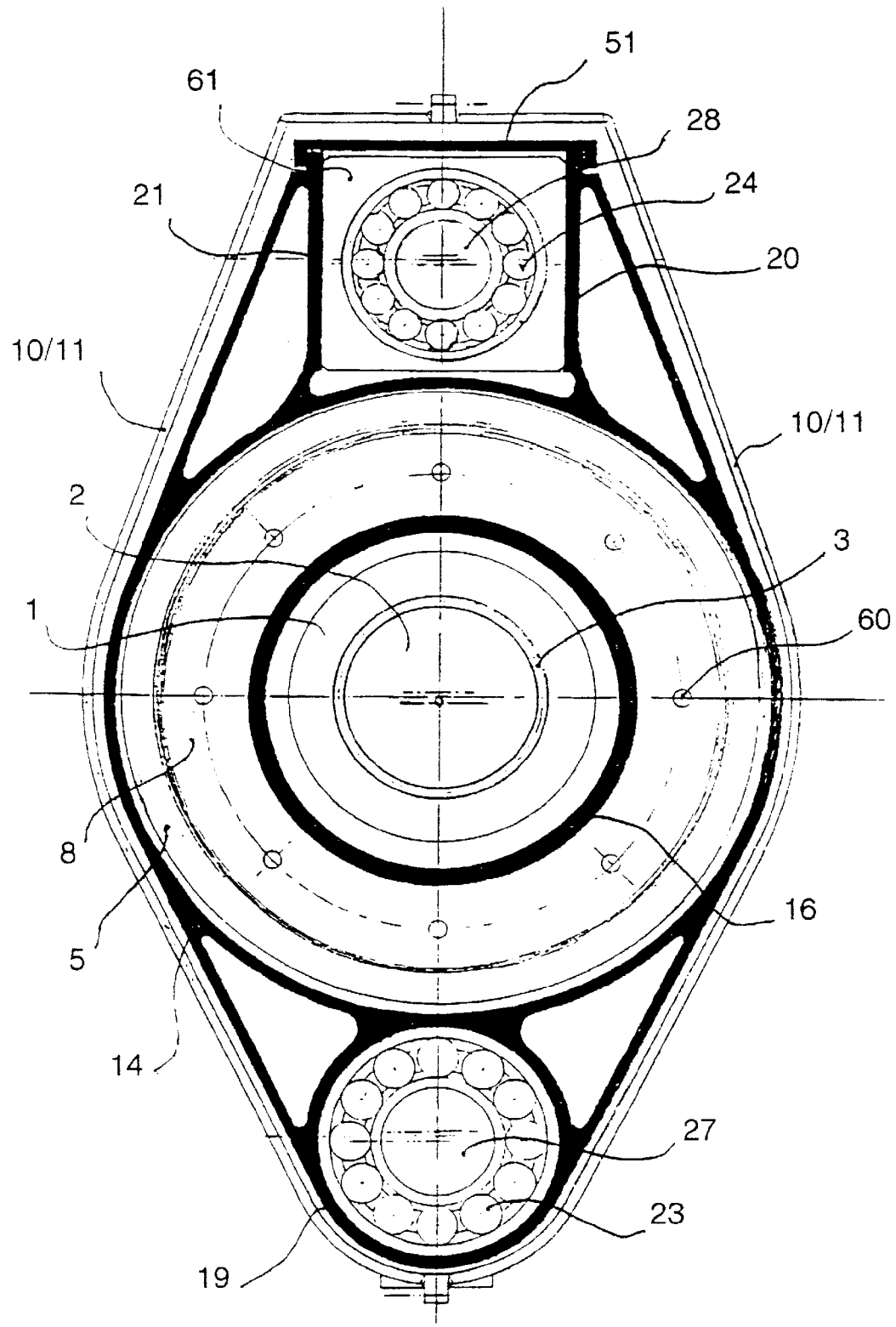
FIG. 5 is a vue passing by the median plane of the eccentric bearings of the torque arm, plane IV,IV on FIG. 4.

For FIG. 1,2 and 3, 1 is the hub which is connected to the driven shaft 2 by the splines 3, 4 is the circular rib for the hub 1 whose periphery is connected to the gear ring with internal teeth 5, this gear ring has two identical parts 6 and 7. 8 is the gear wheel with external teeth which meshes with the gear ring 6, 9 is the gear wheel which meshes with the gear ring 7. The hub 1 is journaled in the side walls 10,11 of the gear box housing by the means of the bearings 12,13. The gear wheels 8,9 are located on the torque arms 14,15 by the means of the centering elements 16,17 and are connected in rotation to those centering elements by the means of elastic split pins 18, those split pins have each a protuberance 51 which enter in a hole drilled in the torque arm to avoid them to rotate around their own axle. The torque arms 14,15 have respectively the protuberances 19,20 and 21,22 which receive the outer ring of the eccentric bearings 23,24 and 25,26. The eccentric shafts 27 and 28 receive the eccentric bearings 23,24 and 25,26. Each eccentric shaft has two eccentrics, 29 and 30 for shaft 27 and 31,32 for shaft 28. The eccentrics 29 and 30 as well as the eccentrics 31 and 32 are respectively shifted 180° one toward the other, due to this, the centrifugal forces due to orbitation of torque arm 14 with gear wheel 8 and bearings 23,24 are compensated by those due to orbitation of torque arm 15 with gear wheel 9 and bearings 25,26. The circular ribs 49 and 50 which centered on the gear rings 6 and 7 are located between the gear wheels 8,9 and the torque arms 14,15 contribute with the circular rib 4 to the rigidity of the gear rings 6 and 7 to limit their ovalisations by the loads. The eccentric bearings 23 and 26 have a normal internal clearance, the eccentric bearings 24 and 25 have a bigger internal clearance, for instance clearance C3, to avoid, in a known maner, parasital efforts in those bearings in case of different thermal dilatations between gear box housing and torque arm. The eccentric shafts 27,28 are respectively driven synchronously and simultaneously by identical gear wheels 33,34 which are driven by identical pinions 35,36 which are respectively solidly fixed to the identical gear wheels 37,38 which are driven by identical pinions 39,40 which are respectively solidly fixed to the identical bevel wheels 41,42 which are respectively driven by the identical bevel pinions 43,44 which are connected together by the rigid coupling 45. the bevel pinions 43,44 are driven by the same motor 52. It is clear that without changing the idea of the invention it is possible to drive directly the eccentric shafts 27,28 with bevel gear wheels, their bevel pinions beeing connected together with a rigid coupling and driven by the same motor. It is also possible to modify the cylindrical prime gear trains, for instance to have cylindrical gear wheels solidly fixed to the pinions 39,40, those cylindrical gear wheels beeing driven by the same pinion which is driven by the motor. For the chosen example, the prime gear trains are designed to facilitate the assembly of the shaft mounted gear box on the driven shaft 2, the plate 47 locate axialy the gear box on the shaft 2, the cover 46 allows access to plate 47 and the part 48 which is part of the cover for the bearing 13 avoid, during assembly or disassembly, to have bolts or nuts falling inside the gear box housing. For the FIG. 4 and 5, 1 is the hub which is connected to the driven shaft 2 by the splines 3, 4 is the circular rig of the hub 1 whose periphery is rigidly connected to the gear ring with internal teeth 5, 8 is the gear wheel with external teeth which meshes with the gear ring 5. The hub 1 is journaled in the side walls 10,11 of the gear box housing by the means of the bearings 12,13. The gear wheel 8 is located on the torque arm 14 by the cylindrical centering 16 and is fixed by the means of the bolts 60. The torque arm 14 has protuberances 19,20 and 21. The protuberance 19 receive the eccentric bearing 23, the protuberances 20 and 21 guide and retain the gliding bloc 61 in which the eccentric bearing 24 is located; the plate 51 join the protuberances 20 and 21 this for a better flow of the efforts. With this assembly the sharing of the efforts between bearings 23 and 24 is well defined, the bearing 24 carry only efforts perpendicular to the common plane for the two eccentric shafts. The eccentric shafts 27 and 28 are journaled in the gear box housing 10,11 by the means of bearings 52,53 and 54,55, those eccentric shafts carry respectively the worm wheels 56 and 57 whose worm shafts, which cannot be seen on the drawing, are respectively connected together by the means of a universal joint 58, one worm shaft extremity 59 beeing used as input shaft for the complete gear box. It is of course possible,when the gear box has two torque arms 14 and 15, like shown on FIG. 2, to have the eccentric bearings 24 and 25 with normal internal clearance located in gliding blocs 61 as shown on FIG. 4 and 5, this is an improvement compared to the assembly of bearings with different internal clearances directly in the torque arms.

I claim:

1. A planacentric gear box having a gear ring with internal teeth and a gear wheel with external teeth, the difference of teeth numbers between gear ring and gear wheel being two to four, having a low speed hub with a circular rib whose periphery is connected to the gear ring with internal teeth, the gear wheel with external teeth orbiting inside the gear ring with internal teeth by the means of eccentrics, the eccentric shafts being synchronously driven by prime reducers having, in a well known manner, cylindrical gears, bevel gears or worm gears, those prime reducers being driven by one common input shaft and one motor, the improvement being that said planacentric gear box has the gear wheel with external teeth connected to a torque arm which passes beside the gear ring with internal teeth, this torque arm having, diametrically opposed, two protuberances receiving each the outer ring of the eccentric bearings which are generating the orbitation of the torque arm and consequently of the gear wheel with external teeth, the median planes of gear wheel and eccentric bearings being close one to the other, the eccentric bearings, located outside the gear ring with internal teeth, being journaled on eccentric shafts whose bearings are located in the side walls of the gear box housing.

2. A planacentric gear box according to claim 1 for which the low speed hub has a circular rib whose periphery is rigidly connected to the median part of a gear ring with internal teeth which is divided in two equal parts by the circular rib of the hub, each part of the gear ring meshing with a gear wheel with external teeth which are each respectively connected to a torque arm passing on each side of the gear ring, those torque arms having each, diametrically opposed, two protuberances receiving each the outer ring of the eccentric bearings which generate the orbitation of each torque arm and consequently of each gear wheel, the median plane of each gear wheel and of the eccentric bearings being respectively close to one another, the eccentric bearings being located on eccentric shafts whose bearings are located in the gear box housing, the eccentric shafts being synchronously driven by prime reducers having in a well known manner, cylindrical gears, bevel gears or worm gears, those prime reducers being driven by a common input shaft and one motor, the two eccentrics for one torque arm and the two eccentrics for the other torque arm being shifted two toward the other two eccentrics, this to balance the centrifugal forces due to the orbiting masses.

3. A planacentric gear box according to claim 2 for which their are only two eccentric shafts for the two torque arms, which means for the two gear wheels, each eccentric shaft having two eccentrics shifted 180° one toward the other, one eccentric of each eccentric shaft being used for one torque arm, the other eccentric of each eccentric shaft being used for the other torque arm.

4. A planacentric gear box according to claims 2 or 3 for which the torque arms have a cylindrical centering element coming inside the gear ring, the gear wheels being centered on the cylindrical centering elements, the gear wheels being rotationaly connected to their cylindrical centering element by the means of elastic split pins having each a protuberance for avoiding the rotation of the split pin around its own axle.

5. A planacentric gear box according to claim 1 for which one protuberance of the torque arm receive directly the eccentric bearing, the other eccentric bearing being centered in a glide bloc gliding between two protuberances of the torque arm and joined together by a plate.

6. A planacentric gear box according to claims 2 or 3 for which each eccentric shaft which has two eccentrics shifted, one of the eccentrics receive an eccentric bearing which is directly journaled in the protuberance of the torque arm, the other eccentric bearing being journaled in a gliding bloc which glides between two protuberances joined by a plate, each torque arm having an eccentric bearing directly journaled in a protuberance the other eccentric bearing for each torque arm being journaled in a gliding bloc gliding between two protuberances joined by a plate.

* * * * *